US012780048B2

(12) United States Patent
Chen et al.

(10) Patent No.: US 12,780,048 B2
(45) Date of Patent: Nov. 3, 2026

(54) ZERO-GRAVITY AUTOMOTIVE SEAT WITH LINKAGE-ADJUSTED SEAT BELT

(71) Applicant: Adient (Chongqing) Automotive Components Co., Ltd., Chongqing (CN)

(72) Inventors: Zhiyong Chen, Chongqing (CN); Ming Zhang, Chongqing (CN); Ying Guan, Chongqing (CN); Yawei Liu, Chongqing (CN); Zhangneng Shi, Chongqing (CN)

(73) Assignee: Adient (Chongqing) Automotive Components Co., Ltd., Huangmaoping (CN)

( * ) Notice: Subject to any disclaimer, the term of this patent is extended or adjusted under 35 U.S.C. 154(b) by 98 days.

(21) Appl. No.: 18/931,168

(22) Filed: Oct. 30, 2024

(65) Prior Publication Data

US 2025/0135963 A1 May 1, 2025

(30) Foreign Application Priority Data

Oct. 30, 2023 (CN) ........................ 202311422452.4

(51) Int. Cl.
*B60N 2/02* (2006.01)
*B60N 2/10* (2006.01)
(Continued)

(52) U.S. Cl.
CPC ........... *B60N 2/02253* (2023.08); *B60N 2/10* (2013.01); *B60N 2/20* (2013.01); *B60R 22/20* (2013.01); *B60R 22/26* (2013.01)

(58) Field of Classification Search
CPC ........ B60N 2/02253; B60N 2/10; B60N 2/20; B60R 22/20; B60R 22/26
(Continued)

(56) References Cited

U.S. PATENT DOCUMENTS 6,517,157 B1 * 2/2003 Vorac ...................... B60R 22/20 297/344.15
6,811,186 B1 11/2004 Fraley et al.
(Continued)

FOREIGN PATENT DOCUMENTS

| | | | | |
|---|---|---|---|---|
| FR | 3128416 A1 | | 4/2023 | |
| JP | H0798471 B2 | * | 10/1995 | ............ B60R 22/26 |
| WO | 2023109028 A1 | | 6/2023 | |

OTHER PUBLICATIONS

The State Intellectual Property Office of People's Republic of China, First Office Action in application CN202311422452.4, dated Jun. 30, 2025, 7 Pages, Beijing, China.
(Continued)

*Primary Examiner* — Anthony D Barfield
(74) *Attorney, Agent, or Firm* — Marshall & Melhorn LLC

(57) ABSTRACT

A zero-gravity automotive seat with linkage-adjusted seat belt, may have a base, a frame, and a drive assembly for driving a front end of the frame to move up and down in a lifting fashion and a linkage assembly. A socket component for fixing the seat belt is mounted and carried on the linkage assembly. The linkage assembly is dynamically linked to the drive assembly. When the drive assembly drives the front end of the frame to move up and down in a lifting fashion, the socket component can move forwards and rearwards synchronously with the linkage assembly. The position of the seat belt socket can be adjusted automatically as the frame of the zero-gravity seat rotates, reducing the feeling of oppression which the belt part of the seat belt engenders in the passenger's abdomen, and increasing the comfort and safety of the seat.

9 Claims, 7 Drawing Sheets

(51) Int. Cl.
*B60N 2/20* (2006.01)
*B60R 22/20* (2006.01)
*B60R 22/26* (2006.01)

(58) Field of Classification Search
USPC ................ 248/429, 430; 297/344.12, 344.15
See application file for complete search history.

(56) References Cited

U.S. PATENT DOCUMENTS

| | | | | |
|---|---|---|---|---|
| 9,994,131 | B1 * | 6/2018 | Swierczewski | B60R 22/26 |
| 2003/0052519 | A1 | 3/2003 | Reynolds et al. | |
| 2003/0160483 | A1 * | 8/2003 | Becker | B60N 2/42736 297/216.16 |
| 2014/0346830 | A1 * | 11/2014 | Tanaka | B60N 2/42718 297/344.15 |

OTHER PUBLICATIONS

European Patent Office, Extended European Search Report, issued in EP Application No. 24209732.7, Mar. 20, 2025, 7 pages, Munich, Germany.

* cited by examiner

ZERO-GRAVITY AUTOMOTIVE SEAT WITH LINKAGE-ADJUSTED SEAT BELT

FIELD

The present invention relates to the technical field of automotive seats, in particular to a zero-gravity automotive seat with linkage-adjusted seat belt.

BACKGROUND

As motor vehicles are upgraded iteratively, consumers are demanding more and more in terms of safety and comfort when travelling in a motor vehicle. In response, zero-gravity seats capable of offering a zero-gravity travelling mode have emerged.

In the zero-gravity mode of a zero-gravity seat, a front end of a seat frame is raised, a backrest is tilted over backwards, and a leg rest is in a slightly inclined attitude. In the zero-gravity mode, a user is able to lie on the seat in a very comfortable posture. However, in the prior art, zero-gravity seats for motor vehicles have not been on the market for long, and therefore still have a large number of imperfections. For example, in the process of an automotive seat switching from a sitting state to a zero-gravity state, due to the fact that the seat belt socket is fixed to a side part of the seat, the belt part of the seat belt will compress the passenger's abdomen when the front end of the seat frame is raised, affecting the passenger's travelling comfort. Secondly, in the zero-gravity state, the seat belt's restraining action on the passenger will be reduced, and if the motor vehicle suffers a collision, the passenger will tend to slide forwards and downwards, i.e. dive down. If this occurs, the belt part of the seat belt will cause serious harm to the passenger's pelvic cavity, abdomen, and even their chest. Moreover, when in such a state, the seat belt will be unable to guarantee the passenger's safety.

SUMMARY

In view of the above, the present invention provides a zero-gravity automotive seat with linkage-adjusted seat belt, which is able to automatically adjust the position of a seat belt socket as a zero-gravity seat frame is rotated, thus increasing seat comfort and safety.

To achieve this objective, the technical solution of the present invention is as follows:

A zero-gravity automotive seat with linkage-adjusted seat belt, characterized by comprising:

a base, configured to be fitted and connected to a floor pan of a motor vehicle;

a frame located at an upper side of the base, a rear end of the frame being rotatably connected to the base, with a drive assembly provided between a front end of the frame and the base, the drive assembly being used for driving the front end of the frame to move up and down in a lifting fashion; and a linkage assembly located at a side part of the frame, with a socket component for fixing a seat belt being mounted and carried on the linkage assembly, the linkage assembly being dynamically linked to the drive assembly, such that when the drive assembly drives the front end of the frame to move up and down in a lifting fashion, the socket component is able to move forwards and rearwards synchronously with the linkage assembly.

Using the structure described above, in the process of the automotive seat switching from a sitting state to a zero-gravity state, the drive assembly drives the frame to rotate upwards, driving the linkage assembly to move, i.e. synchronously driving the socket component on the linkage assembly to move forwards. The forward movement of the socket component can reduce the feeling of oppression which a belt part of the seat belt engenders in a passenger's abdomen, thus increasing the comfort of the seat in the zero-gravity state. At the same time, the forward movement of the socket component can prevent the passenger from diving down during a collision of the motor vehicle, effectively reducing harm caused to the passenger by a motor vehicle collision in the zero-gravity state.

Preferably, the drive assembly comprises an upper linkage component and a lower linkage component, the upper linkage component having one end rotatably connected to the front end of the frame and another end hinged to the lower linkage component, the lower linkage component being rotatably disposed at a front end of the base by means of an electric angle adjuster, and the linkage assembly being dynamically linked to the lower linkage component.

Preferably, the linkage assembly comprises a first linkage plate, a second linkage plate, a third linkage plate and a fourth linkage plate, which are hinged end-to-end in sequence; an end of the first linkage plate that is remote from the second linkage plate is rotatably connected to the lower linkage component, a middle part of the second linkage plate is rotatably connected to the base, an end of the fourth linkage plate that is remote from the third linkage plate is rotatably connected to a rear end of the frame, and the socket component is mounted on the third linkage plate.

Preferably, an adapter component is fixed to the lower linkage component, the adapter component being located in a direction of radial extension of the electric angle adjuster, and the first linkage plate being rotatably connected to the adapter component.

Preferably, a connecting platform is fixed to the base, the second linkage plate being hinged to a side part of the connecting platform.

Preferably, the third linkage plate is provided with a mounting hole, the socket component being rotatably fitted to the mounting hole by means of a rotation shaft.

Preferably, the third linkage plate is provided with an arc-shaped groove at an upper side of the mounting hole, and the socket component is provided with a locating pin at a position corresponding to the arc-shaped groove, the locating pin being inserted in the arc-shaped groove and slidable in a length direction of the arc-shaped groove.

Preferably, one said drive assembly and one said linkage assembly are provided at each of left and right sides of the seat, wherein the socket component is mounted and carried on the linkage assembly at one side, and a lower anchor point component for fixing the seat belt is mounted and carried on the linkage assembly at the other side.

Preferably, a backrest is rotatably fitted to the rear end of the frame, an up-down movement module and a left-right movement module being provided at an upper side of the backrest, the up-down movement module being used for controlling a seat belt outlet component to move up and down, and the left-right movement module being used for controlling the outlet component to move left and right.

Preferably, the up-down movement module comprises a transitional block, a base, a lead screw rotatably fitted to the base, and an electric motor for driving the lead screw to rotate, the lead screw being screwed into the transitional block, and the seat belt outlet component being fixedly fitted to the transitional block. Compared with the prior art, the present invention has the following beneficial effects:

1. Using the zero-gravity automotive seat with linkage-adjusted seat belt as provided in the present invention, in the process of the automotive seat switching from a sitting state to a zero-gravity state, the drive assembly drives the front end of the frame to lift upwards, driving the linkage assembly to move, i.e. synchronously driving the socket component on the linkage assembly to move forwards. The forward movement of the socket component can reduce the feeling of oppression which a belt part of the seat belt engenders in the passenger's abdomen, thus increasing the comfort of the seat in the zero-gravity state. At the same time, the forward movement of the socket component can ensure that the belt part of the seat belt is always in an optimal restraining state, preventing the passenger from diving down during a collision of the motor vehicle, and effectively reducing harm caused to the passenger by a motor vehicle collision in the zero-gravity state, thus increasing the safety of the zero-gravity seat.
2. Using the zero-gravity automotive seat with linkage-adjusted seat belt as provided in the present invention, the driving force of the frame's rotation can be transmitted to the socket component through the connections between the linkage plates. Compared with other seat belt sockets that need to be driven to move by a driving force source and a control module, this has the advantages of a simple structure and a low cost.
3. Using the zero-gravity automotive seat with linkage-adjusted seat belt as provided in the present invention, as a result of having the socket component and the lower anchor point component of the seat belt arranged symmetrically, the lower anchor point component and the socket component can move forwards synchronously in the process of the frame lifting upwards, further reducing compression of the passenger's abdomen by the seat belt in the zero-gravity state, and increasing the comfort and safety of the zero-gravity seat.
4. As a result of having the socket component rotatably mounted on the third linkage plate, the socket component can adaptively rotate to a suitable position according to the passenger's body type and posture when the socket component moves forward with the linkage assembly, thus further increasing the comfort of the seat in the zero-gravity state.
5. As a result of providing the up-down movement module and the left-right movement module at an upper side of the backrest, the seat belt outlet component can be controlled to move up, down, left and right when the seat is in the zero-gravity state, so that the seat belt as a whole is in an optimal restraining state, while ensuring the comfort of the passenger when travelling.

DETAILED DESCRIPTION

The present invention is explained further below in conjunction with embodiments and the drawings.

The positions "front", "rear", "upper", "lower", "left" and "right" mentioned in this embodiment refer to a state of normal use of an automotive seat.

Figure 1:
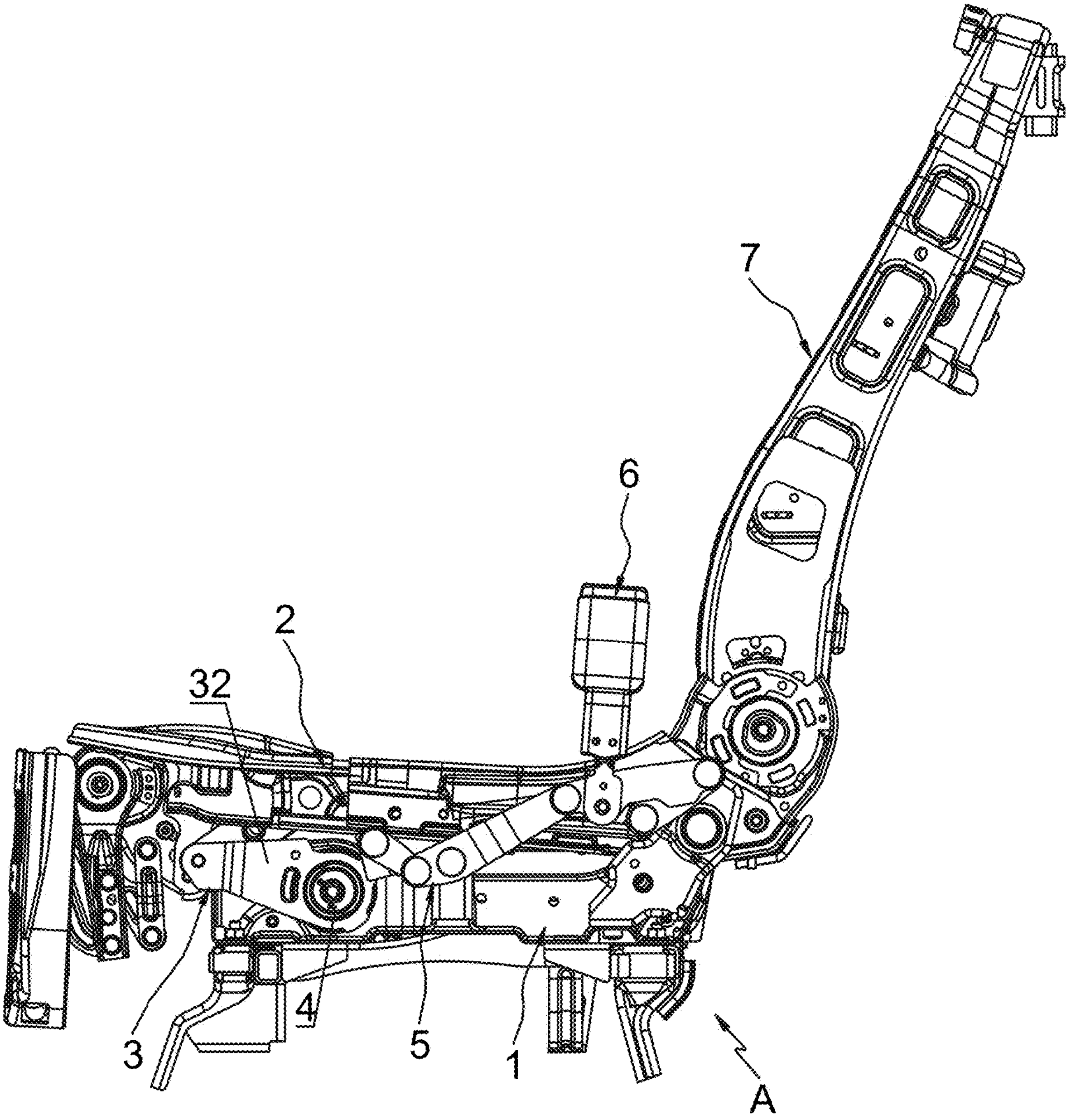
FIG. 1 is a structural schematic drawing of a zero-gravity automotive seat in a sitting state.
Figure 7:
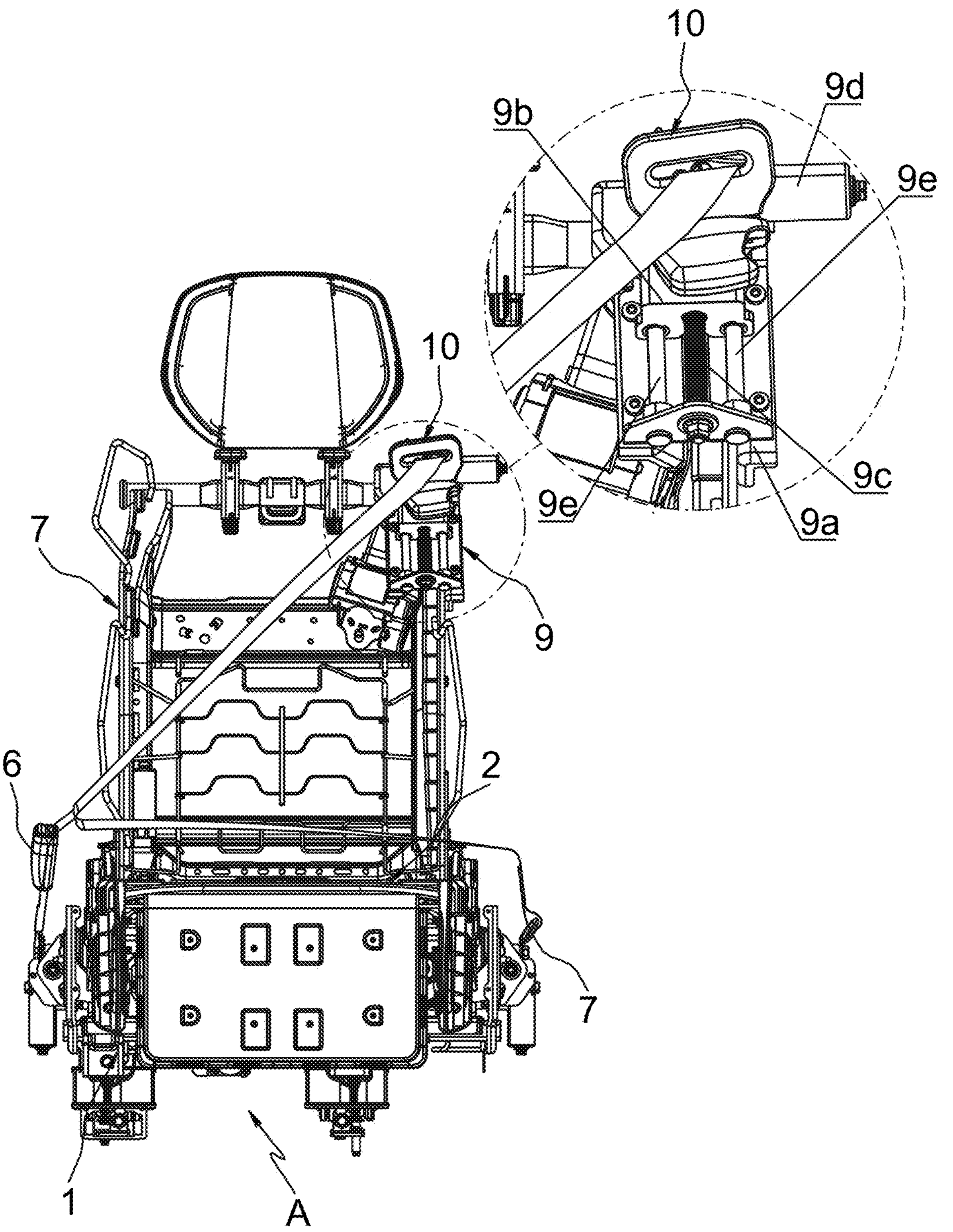
FIG. 7 is a front view of a zero-gravity automotive seat.

As shown in FIGS. 1 and 7, a zero-gravity automotive seat with linkage-adjusted seat belt comprises a seat body A and a seat belt, wherein the seat body A has a base 1, a frame 2 located at an upper side of the base 1, and a backrest 8 rotatably fitted to a rear end of the frame 2, the base 1 being configured to be fitted and connected to a motor vehicle floor pan, and the rear end of the frame 2 being rotatably connected to the base 1. In this embodiment, the seat belt is a three-point seat belt, comprising an outlet component 10 mounted at one side of a shoulder of the backrest 8, and a socket component 6 and a lower anchor point component 7 mounted at left and right sides of the frame 2. A drive assembly 3 is provided between the base 1 and the frame 2, the drive assembly 3 being able to drive a front end of the frame 2 to move up and down in a lifting fashion; a side part of the frame 2 is provided with a linkage assembly 5, the linkage assembly 5 being dynamically linked to the drive assembly 3, and the socket component 6 being mounted on the linkage assembly 5.

Based on the structural design described above, in the process of the automotive seat switching from a sitting state to a zero-gravity state (see FIG. 1→FIG. 2), the drive assembly 3 drives the front end of the frame 2 to lift upwards, driving the linkage assembly 5 to move, i.e. synchronously driving the socket component 6 on the linkage assembly 5 to move forwards. The forward movement of the socket component 6 can reduce the feeling of oppression which a belt part of the seat belt engenders in the passenger's abdomen, thus increasing the comfort of the seat in the zero-gravity state. At the same time, the forward movement of the socket component 6 can ensure that the belt part of the seat belt is always in an optimal restraining state, preventing the passenger from diving down during a collision of the motor vehicle, and effectively reducing harm caused to the passenger by a motor vehicle collision in the zero-gravity state, thus increasing the safety of the zero-gravity seat. By the same principle, when the frame 2 rotates downwards, i.e. when the seat returns to the sitting state, the drive assembly 3 drives the socket component 6 on the linkage assembly 5 to move rearwards, to ensure that the seat belt is always in an optimal restraining state.

Figure 4:
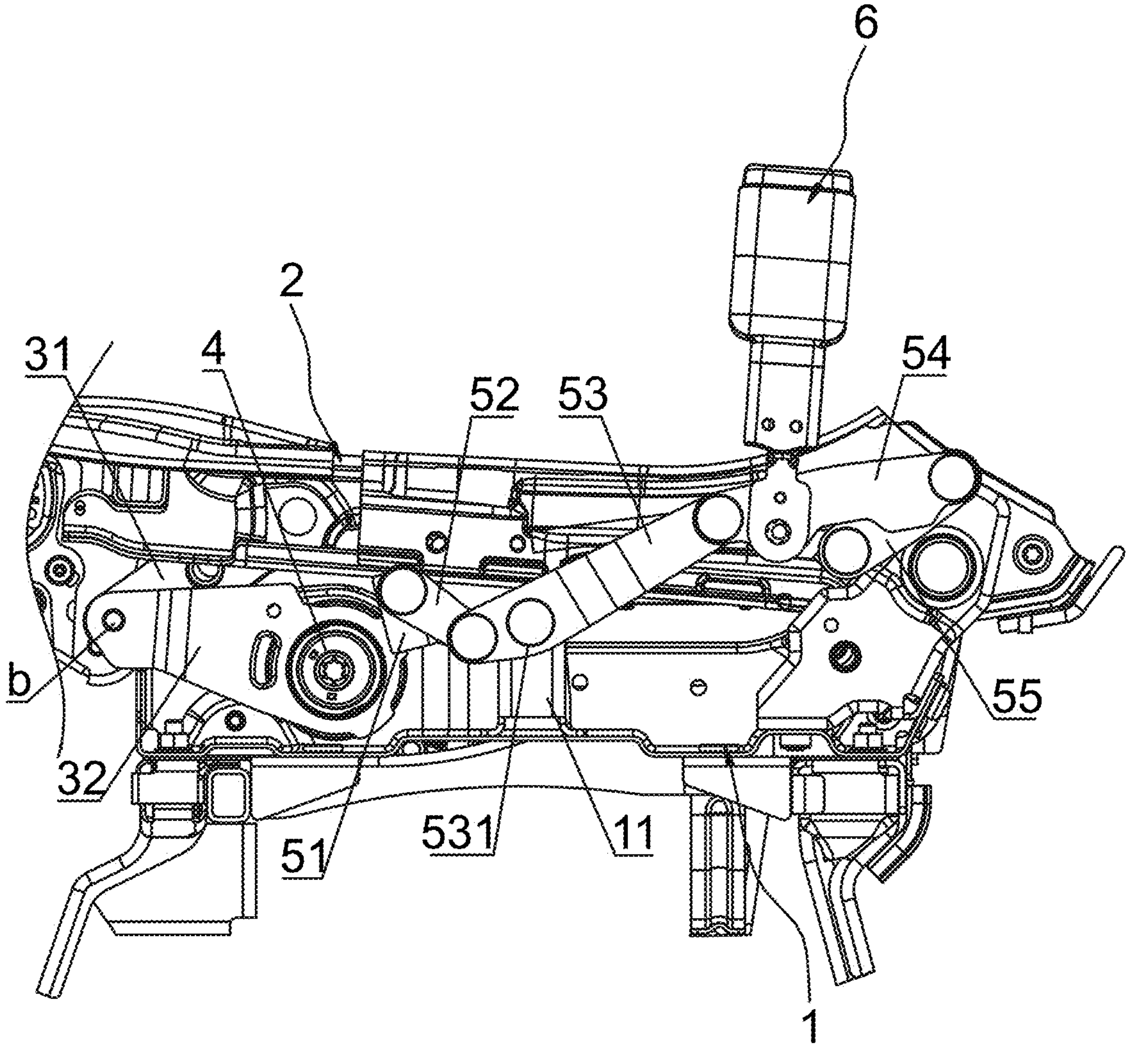
FIG. 4 is a schematic drawing showing how the linkage assembly 5, the frame 2 and the base 1 are connected to each other in the sitting state.

Furthermore, referring to FIGS. 1 and 4, the drive assembly 3 comprises an upper linkage component 31 and a lower linkage component 32, wherein the upper linkage component 31 has one end rotatably connected to the front end of the frame 2 and another end hinged to the lower linkage component 32. In this embodiment, the upper linkage component 31 and the lower linkage component 32 are hinged to each other via a pin b. An end of the lower linkage component 32 that is remote from the pin b is rotatably disposed at a front end of the base 1 by means of an electric angle adjuster 4, and the linkage assembly 5 is dynamically linked to the lower linkage component 32. The electric angle adjuster 4 operates to drive the lower linkage component 32 to rotate, and a front end of the lower linkage component 32 moves upwards, driving a rear end of the upper linkage component 31 to lift upwards, thereby achieving upward rotation of a front part of the frame 2. At the same time, as can be seen from FIG. 2, as it rotates upwards, the lower linkage component 32 can drive the socket component 6 on the linkage assembly 5 to move forwards, thereby ensuring that the passenger's abdomen is not compressed by the seat belt in the zero-gravity state of the seat.

Now referring to FIG. 4, the linkage assembly 5 comprises a first linkage plate 52, a second linkage plate 53, a third linkage plate 54 and a fourth linkage plate 55, which are hinged end-to-end in sequence. An end of the first linkage plate 52 that is remote from the second linkage plate 53 is rotatably connected to the lower linkage component 32, a middle part of the second linkage plate 53 is rotatably connected to the base 1, an end of the fourth linkage plate 55 that is remote from the third linkage plate 54 is rotatably connected to a rear end of the frame 2, and the socket component 6 is mounted on the third linkage plate 54. In this embodiment, the linkage plates are rotatably connected end-to-end by means of rivets. In an initial state of the frame 2, a front end of the first linkage plate 52 is rotatably connected to the lower linkage component 32, a rear end of the first linkage plate is connected to a front end of the second linkage plate 53, a rear end of the second linkage plate 53 is rotatably connected to a front end of the third linkage plate 54, a rear end of the third linkage plate 54 is rotatably connected to an upper end of the fourth linkage plate 55, a lower end of the fourth linkage plate 55 is rotatably connected to a rear end of the frame 2, and the middle part of the second linkage plate 53 is rotatably connected to the base 1 by means of a rivet.

The second linkage plate 53, the third linkage plate 54, the fourth linkage plate 55 and the base 1 form a four-link mechanism. The electric angle adjuster 5 drives the lower linkage component 32 to rotate, then pulls the second linkage plate 53 via the first linkage plate 52 to swing forwards and rearwards, and can thus achieve motion by a four-link mechanism, thereby achieving fluid motion of the socket component 6 forwards and rearwards.

Figure 3:
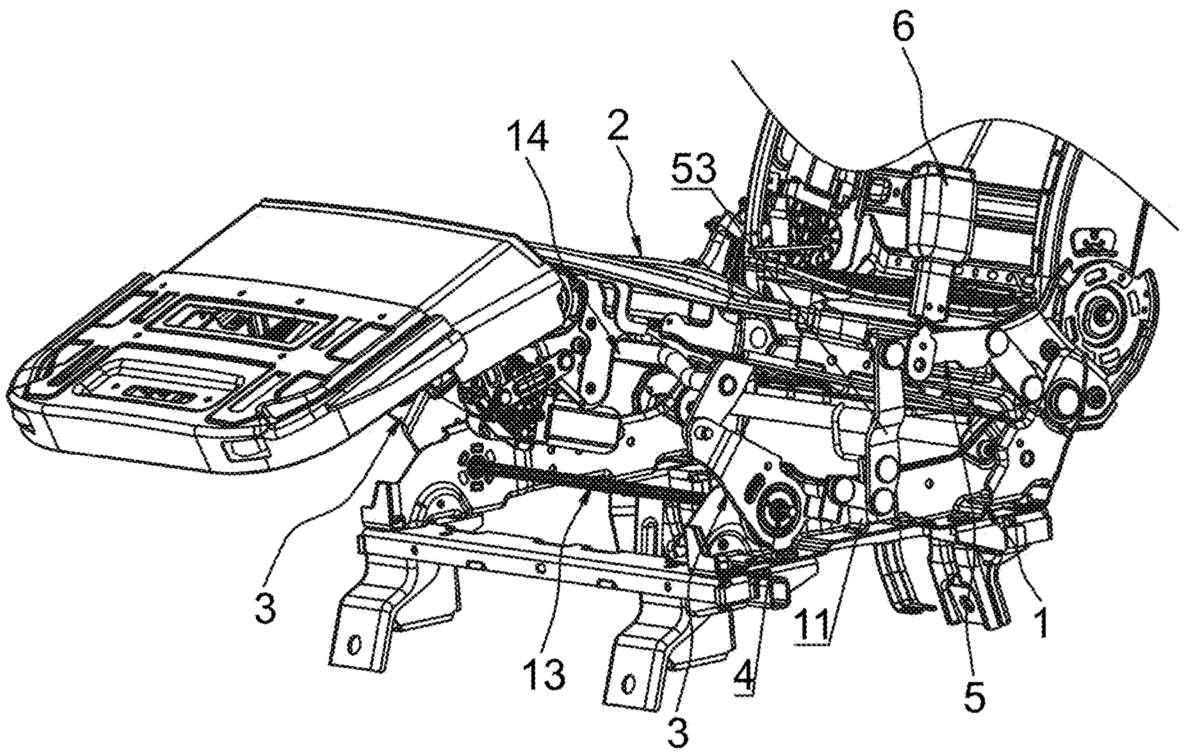
FIG. 3 is a 3D schematic drawing of an automotive seat in a zero-gravity state.
Figure 5:
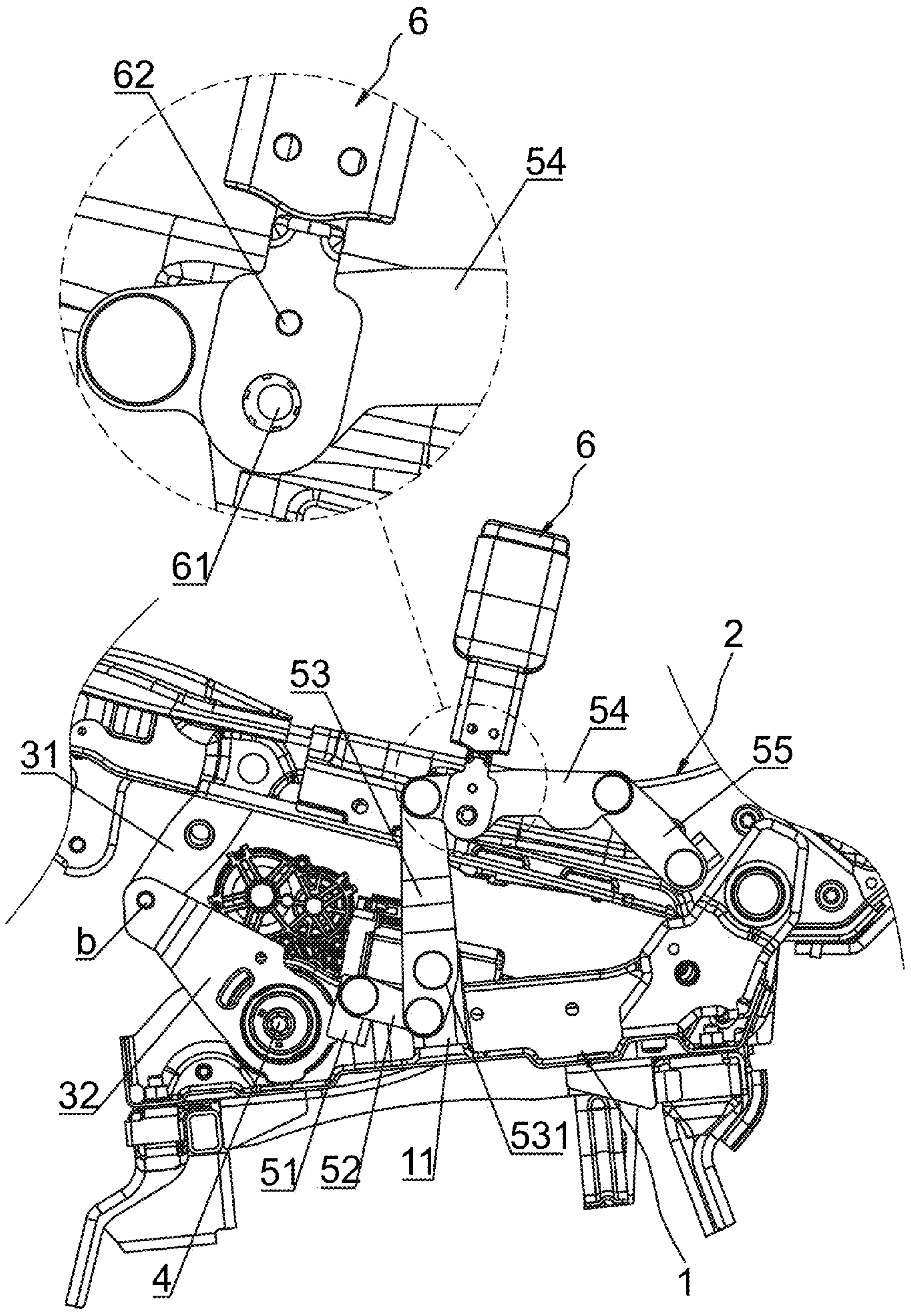
FIG. 5 is a schematic drawing showing how the linkage assembly 5, the frame 2 and the base 1 are connected to each other in the zero-gravity state.

Referring to FIGS. 3 and 5, in this embodiment, to facilitate a stable connection between the second linkage plate 53 and the base 1, a connecting platform 11 is fixed to the base 1, the second linkage plate 53 is provided with a connecting hole 531 at a position close to the front end thereof, and the connecting hole 531 is rotatably connected to the connecting platform 11 by means of a rivet.

Further, referring to FIGS. 4 and 5, an adapter component 51 is fixed to the lower linkage component 32; the adapter component 51 is located in a direction of radial extension of the electric angle adjuster 4, and the first linkage plate 52 is rotatably connected to the adapter component 51. In the process of the seat switching from the sitting state to the zero-gravity state, i.e. in the process of the frame 2 moving upwards, the front end of the lower linkage component 32 rotates upwards while a rear end thereof rotates downwards, driving the adapter component 51 on the lower linkage component 32 to move downwards; the downward movement of the adapter component 51 drives the rear end of the first linkage plate 52 to move downwards, thereby pulling the second linkage plate 53 to rotate anticlockwise with the connecting hole 531 as a fulcrum, and thereby driving the third linkage plate 54 to move forwards. Forward movement of the socket component 6 on the third linkage plate 54 is thus achieved.

Figure 6:
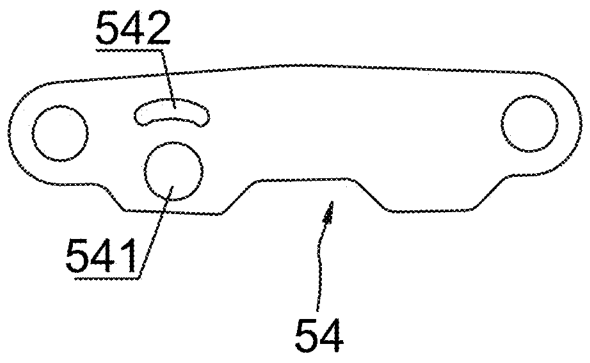
FIG. 6 is a structural schematic drawing of a third linkage plate 54.

Referring to FIGS. 5 and 6, the third linkage plate 54 is provided with a mounting hole 541 and an arc-shaped groove 542, the arc-shaped groove 542 being located at an upper side of the mounting hole 541. The socket component 6 is rotatably fitted to the mounting hole 541 by means of a rotation shaft 61, and the socket component 6 is provided with a locating pin 62 at a position corresponding to the arc-shaped groove 542. The locating pin 62 is adapted in width to the arc-shaped groove 542, and is able to slide forwards and rearwards in the arc-shaped groove 542. With this design, when the socket component 6 moves forwards with the third linkage plate 54, the rotatable fitment of the socket component 6 combined with the restraining action of the arc-shaped groove 542 can ensure that the socket component 6 roughly points upwards and is adaptively rotatable to a suitable position according to the passenger's body shape and the attitude of the seat, thus further increasing the comfort of the seat in the zero-gravity state.

Figure 2:
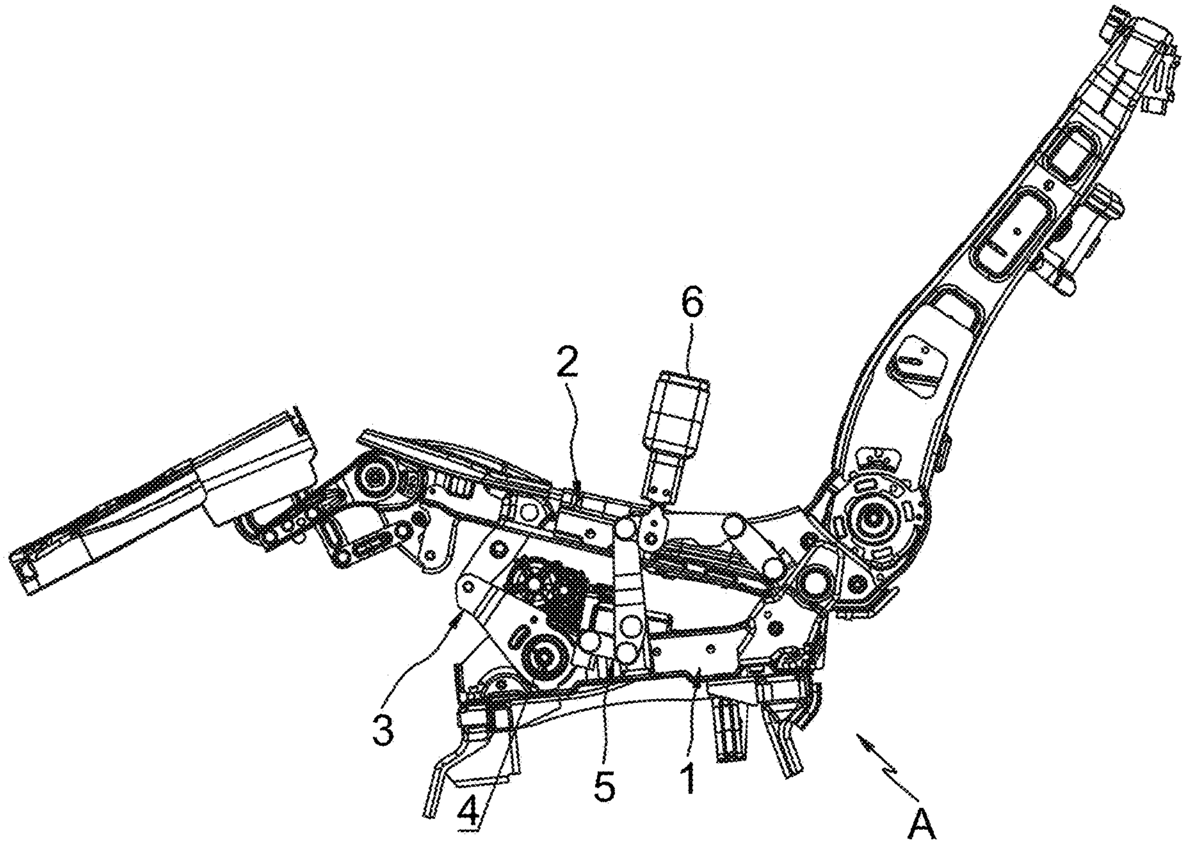
FIG. 2 is a structural schematic drawing of an automotive seat in a zero-gravity state.

As shown in FIGS. 1-3, in this embodiment, one drive assembly 3 and one linkage assembly 5 are provided at each of the left and right sides of the seat, wherein the socket component 6 is mounted and carried on the linkage assembly 5 at one side, and the lower anchor point component 7 for fixing the seat belt is mounted and carried on the linkage assembly 5 at the other side. The upper linkage components 31 at the two sides are synchronously connected to each other by means of a first synchronizing bar 14, and the lower linkage components 32 at the two sides are synchronously connected to each other by means of a second synchronizing bar 13. Taking this into account, in the process of the frame 2 rotating upwards, the lower anchor point component 7 and the socket component 6 can move forwards synchronously, further reducing compression of the passenger's abdomen by the seat belt in the zero-gravity state.

In this embodiment, the drive assembly 3 and linkage assembly 5 on one side have the same structure as the drive assembly 3 and linkage assembly 5 on the other side, so the principle of operation of the assemblies on the other side is not described again.

Referring to FIG. 7, an up-down movement module 9 and a left-right movement module are provided at one side of the shoulder of the backrest 8, the up-down movement module 9 being able to control the seat belt outlet component 10 to move up and down, and the left-right movement module being able to control the outlet component 10 to move left and right. When the frame 2 moves upwards and the backrest 8 simultaneously tilts over backwards, not only can the lower anchor point component 7 and the socket component 6 move forwards synchronously, the movement modules can control the outlet component 10 to move up, down, left and right, so that the seat belt as a whole is in an optimal restraining state, to ensure the safety of the passenger.

Further, the up-down movement module 9 comprises a transitional block **9*b*, a base 9*a*, a lead screw 9*c* rotatably fitted to the base 9*a*, and an electric motor 9*d* for driving the lead screw 9*c* to rotate. The lead screw 9*c* is screwed into the transitional block 9*b*, and the electric motor 9*d* drives the lead screw 9*c* to rotate, thus driving the transitional block 9*b* to slide up and down on the base 9*a*. The seat belt outlet component 10 is fixedly fitted to the transitional block 9*b*, and the up/down sliding of the transitional block 9*b* can drive the outlet component 10** to move up and down.

Now referring to FIG. 7, two guide rods **9*e* parallel to the lead screw 9*c* are fixedly mounted on the base 9*a*, the two guide rods 9*e* passing through the transitional block 9*b* in such a way as to allow sliding thereof. With this design, the two guide rods 9*e* serve a guiding function when the transitional block 9*b* is sliding, enabling the transitional block 9*b*** to slide up and down in a stable manner.

Further, the base 9*a* is connected to the left-right movement module, which is used for driving the base 9*a* to slide left and right, thereby driving the outlet component 10 to move left and right. In this embodiment, the left-right movement module employs a drive mechanism identical to that of the up-down movement module 9, or uses another linear drive mechanism to achieve left-right movement.

Finally, it should be explained that the above description is only of preferred embodiments of the present invention, and those skilled in the art, having been enlightened by the present invention, could make various similar representations without going against the purpose of the present invention and the claims, all such changes falling within the scope of protection of the present invention.

The invention claimed is:

1. A zero-gravity automotive seat with linkage-adjusted seat belt, comprising:

a base, configured to be fitted and connected to a floor pan of a motor vehicle;

a frame located at an upper side of the base, wherein the frame comprises a front end and a rear end being rotatably connected to the base, a drive assembly provided between the front end of the frame and the base, wherein the drive assembly being used for driving the front end of the frame to move up and down in a lifting fashion;

a linkage assembly located at a side part of the frame, and a socket component being mounted and carried on the linkage assembly for fixing a seat belt, wherein the linkage assembly being dynamically linked to the drive assembly, such that when the drive assembly drives the front end of the frame to move up and down in a lifting fashion, the socket component is able to move forwards and rearwards synchronously with the linkage assembly, wherein the drive assembly comprises an upper linkage component and a lower linkage component, the upper linkage component having one end rotatably connected to the front end of the frame and another end hinged to the lower linkage component, the lower linkage component being rotatably disposed at a front end of the base by means of an electric angle adjuster, and the linkage assembly being dynamically linked to the lower linkage component.

2. The zero-gravity automotive seat with linkage-adjusted seat belt according to claim 1, characterized in that the linkage assembly comprises a first linkage plate, a second linkage plate, a third linkage plate and a fourth linkage plate, which are hinged end-to-end in sequence; an end of the first linkage plate that is remote from the second linkage plate is rotatably connected to the lower linkage component, a middle part of the second linkage plate is rotatably connected to the base, an end of the fourth linkage plate that is remote from the third linkage plate is rotatably connected to a rear end of the frame, and the socket component is mounted on the third linkage plate.

3. The zero-gravity automotive seat with linkage-adjusted seat belt according to claim 2, characterized in that an adapter component is fixed to the lower linkage component, the adapter component being located in a direction of radial extension of the electric angle adjuster, and the first linkage plate being rotatably connected to the adapter component.

4. The zero-gravity automotive seat with linkage-adjusted seat belt according to claim 2, characterized in that a connecting platform is fixed to the base, the second linkage plate being hinged to a side part of the connecting platform.

5. The zero-gravity automotive seat with linkage-adjusted seat belt according to claim 2, characterized in that the third linkage plate is provided with a mounting hole, the socket component being rotatably fitted to the mounting hole by means of a rotation shaft.

6. The zero-gravity automotive seat with linkage-adjusted seat belt according to claim 5, characterized in that the third linkage plate is provided with an arc-shaped groove at an upper side of the mounting hole, and the socket component is provided with a locating pin at a position corresponding to the arc-shaped groove, the locating pin being inserted in the arc-shaped groove and slidable in a length direction of the arc-shaped groove.

7. The zero-gravity automotive seat with linkage-adjusted seat belt according to claim 1, characterized in that one said drive assembly and one said linkage assembly are provided at each of left and right sides of the seat, wherein the socket component is mounted and carried on the linkage assembly at one side, and a lower anchor point component for fixing the seat belt is mounted and carried on the linkage assembly at the other side.

8. The zero-gravity automotive seat with linkage-adjusted seat belt according to claim 1, characterized in that a backrest is rotatably fitted to the rear end of the frame, an up-down movement module and a left-right movement module being provided at an upper side of the backrest, the up-down movement module being used for controlling a seat belt outlet component to move up and down, and the left-right movement module being used for controlling the outlet component to move left and right.

9. The zero-gravity automotive seat with linkage-adjusted seat belt according to claim 8, characterized in that the up-down movement module comprises a transitional block, a base, a lead screw rotatably fitted to the base, and an electric motor for driving the lead screw to rotate, the lead screw being screwed into the transitional block, and the seat belt outlet component being fixedly fitted to the transitional block.

* * * * *